United States Patent [19]
Todorovich

[11] Patent Number: 5,497,474
[45] Date of Patent: Mar. 5, 1996

[54] DATA STREAM ADDRESSING

[75] Inventor: Mark Todorovich, Medford Lakes, N.J.

[73] Assignee: Franklin Electronic Publishers, Incorporated, Mt. Holly, N.J.

[21] Appl. No.: 23,370

[22] Filed: Feb. 25, 1993

[51] Int. Cl.[6] .............................. G06F 12/02; G06F 13/00
[52] U.S. Cl. ................. 395/429; 395/421.01; 364/244.6; 364/246.3; 364/251.7; 364/DIG. 1; 364/933.6; 364/DIG. 2
[58] Field of Search .............................. 395/200 MS File, 395/900 MS File, 425, 429; 364/244.6, 246.3, 251.7, 933.6

[56] References Cited

U.S. PATENT DOCUMENTS 3,938,100  2/1976  Steiner ................................ 340/172.5
4,145,738  3/1979  Inoue et al. .............................. 395/400
5,295,250  3/1994  Komoto et al. .......................... 395/375
5,369,773  11/1994  Hammerstrom ........................ 395/800

Primary Examiner—Reba I. Elmore
Assistant Examiner—Frank J. Asta
Attorney, Agent, or Firm—McAulay Fisher Nissen Goldberg & Kiel

[57] ABSTRACT

A number of memory locations are reserved in computer memory to store pointers which indicate an address within streams of sequentially arranged data. The data stream to be scanned is selected. To scan the information stored within the data stream, a single register is provided to increment the pointer corresponding to that data stream. The pointer information is then incremented and stored into the reserved memory location. The process of selecting, scanning, incrementing, and storing may repeat for each data stream to which access is sought.

11 Claims, 2 Drawing Sheets

DATA STREAM ADDRESSING

BACKGROUND OF THE INVENTION

This invention relates in general to a technique for efficiently employing the hardware and software in a data processing system. More particularly, this invention is directed to providing multiple data stream pointers to a CPU by employing a custom chip having a single register.

Data processing systems are known, including the self-contained hand-held variety, in which a central processing unit (CPU) responds to keyboard inputs, reads from a read only memory (ROM), and interfaces with a random access memory (RAM).

When operating upon data stored in sequentially arranged memory locations (data streams), the use of a memory location for storing the address of the data position currently being accessed has proven effective. The address contained in the memory location is often called the data stream pointer. By incrementing the data stream pointer, the next sequentially stored data may be accessed.

Incrementing the data stream pointer using the registers provided within certain CPUs, however, has been found to be inefficient because some CPUs have a limited number of internal registers. In addition, the internal CPU registers are often of a limited size. When a large address (more than eight bits) must be incremented by a CPU having small registers, the reading and incrementing must be performed on the large address, one byte at a time. Therefore, the inefficiency of incrementing a large address grows as the size of the ROM increases because the number of address bits must increase to accommodate the ROM size. As a result, external increment counters (registers) have been used to hold and increment the pointers, eliminating the need to transmit the pointers to the CPU for incrementing, and thus avoiding the limitations internal to the CPU. The CPU continues to access and operate upon the data pointed to by the pointer.

When dealing with multiple data streams, a number of registers equal to the number of data streams to be scanned has been provided. Providing multiple registers to access multiple data streams of sequentially arranged data, however, has a number of drawbacks. For example, additional hardware space is needed to accommodate the ROM addressing registers and the system cost increases due to the added registers and associated connections required.

Techniques for speeding up processing are part of a trade-off between CPU capacity, hardware costs, and response time. In order to provide compact, relatively inexpensive data processing units, and in particular, those that are self-contained, battery operated, and hand-held, it is important that the most efficient use of hardware and software be employed so that cost and size are minimized, while response time is maintained at an acceptable level.

Accordingly, the major purpose of this invention is to provide a technique for accessing multiple data streams by employing a single register to increment the pointers assigned to each of the data streams.

SUMMARY OF THE INVENTION

One embodiment of this invention is for use in hand-held spelling correctors, dictionaries and the like having a keyboard input and an LCD display. The system address bus is primarily employed to connect the CPU and custom chip to the system memory.

A custom chip having a twenty-four bit ROM addressing register is employed to supplement the hardware of the CPU. The ROM addressing register is used to provide twenty-four bit addresses to a twenty-four line address bus for addressing sequentially arranged data stored in the ROM. The combination of the specific purpose custom chip circuitry and the inclusion of a twenty-four bit ROM addressing register permits faster ROM scanning than can be had with CPU's having registers which are incapable of directly incrementing twenty-four bits. When a twenty-four bit address is to be incremented within a general purpose CPU having limited register capability, multiple registers and additional clock cycles would be needed. Therefore, with a twenty-four bit ROM addressing register, address space corresponding to sixteen Mega bytes of memory may be accessed directly and more quickly.

The ability to index sequential addresses quickly is important, particularly in a hand-held system, where compressed memory storage is often used.

A number of storage locations are set aside in the RAM to store addresses which correspond to a location within a ROM data stream. Each address contained within each storage location is a data stream pointer. The number of data stream pointer storage locations is in effect the number of virtual registers being supplied. Each data stream pointer is assigned to a specific virtual register. The term virtual register herein shall mean the effect of each RAM storage location capable of storing a data stream pointer and the ability to use that to address a data stream.

A number of sequential memory addresses are set aside in RAM. This block of sequential RAM addresses is divided into two portions, the lower portion and the upper portion. Both the upper and lower portions of this block are further subdivided. The subdivisions of the lower portion are used to inform the ROM addressing register that a data stream read is to occur on the corresponding data stream. The subdivisions of the upper portion are the set of addresses of a storage location in RAM which contains the pointer for use with a particular virtual register. When the ROM addressing register is instructed to access a specific data stream whose pointer is not currently within the ROM addressing register, the custom chip retrieves the desired pointer from the RAM storage and places it within the ROM addressing register.

During operation, the custom chip monitors the addresses placed upon the address bus by the CPU. When the CPU reads from an address in the lower portion, the ROM addressing register and control circuitry of the custom chip are activated. A relationship exists between the addresses in the lower portion and the upper portion so that the control circuitry may calculate the corresponding upper portion from the lower portion sent by the CPU. The control circuitry may then retrieve the corresponding pointer by placing the address of the RAM storage location where the appropriate pointer is held onto the system address bus if the pointer is not currently within the ROM addressing register. The pointer is then read into the ROM addressing register. If the pointer is already within the ROM register, the pointer need not be retrieved from its corresponding RAM storage location. Once the pointer corresponding to the data stream to be operated upon is within the ROM addressing register, the address contained in the ROM addressing register is placed onto the system address bus. As a result, the data located at the ROM address indexed by the data stream pointer is placed onto the data bus and read by the CPU.

The ROM addressing register then increments the pointer that it is holding. The RAM storage location which stores the pointer is also updated. At this point, the address of the next position in the data stream is in the ROM addressing register and the data stored at that address may be retrieved by the CPU merely by requesting data from the address of the lower portion corresponding to the present data stream. Since the pointer is currently within the ROM addressing register, the ROM addressing register merely places the pointer onto the system address bus. As a result, the corresponding data is made available to the CPU over the data bus. This series of steps is repeated as many times as is necessary.

If the pointer sought is not currently within the ROM addressing register, the new pointer is read into the ROM addressing register. Once the appropriate pointer is placed into the ROM addressing register, the steps of retrieving the data located at the pointer address, incrementing the pointer, and updating the pointer RAM storage are then performed.

In this fashion, therefore, a single register is used to operate upon multiple data streams containing sequentially arranged data. The computer incorporating this invention, in effect, provides a number of ROM addressing registers equal to the number of address storage locations set aside in the RAM. That number is the number of virtual registers provided by this invention.

DESCRIPTION OF THE PREFERRED EMBODIMENTS

Figure 1:
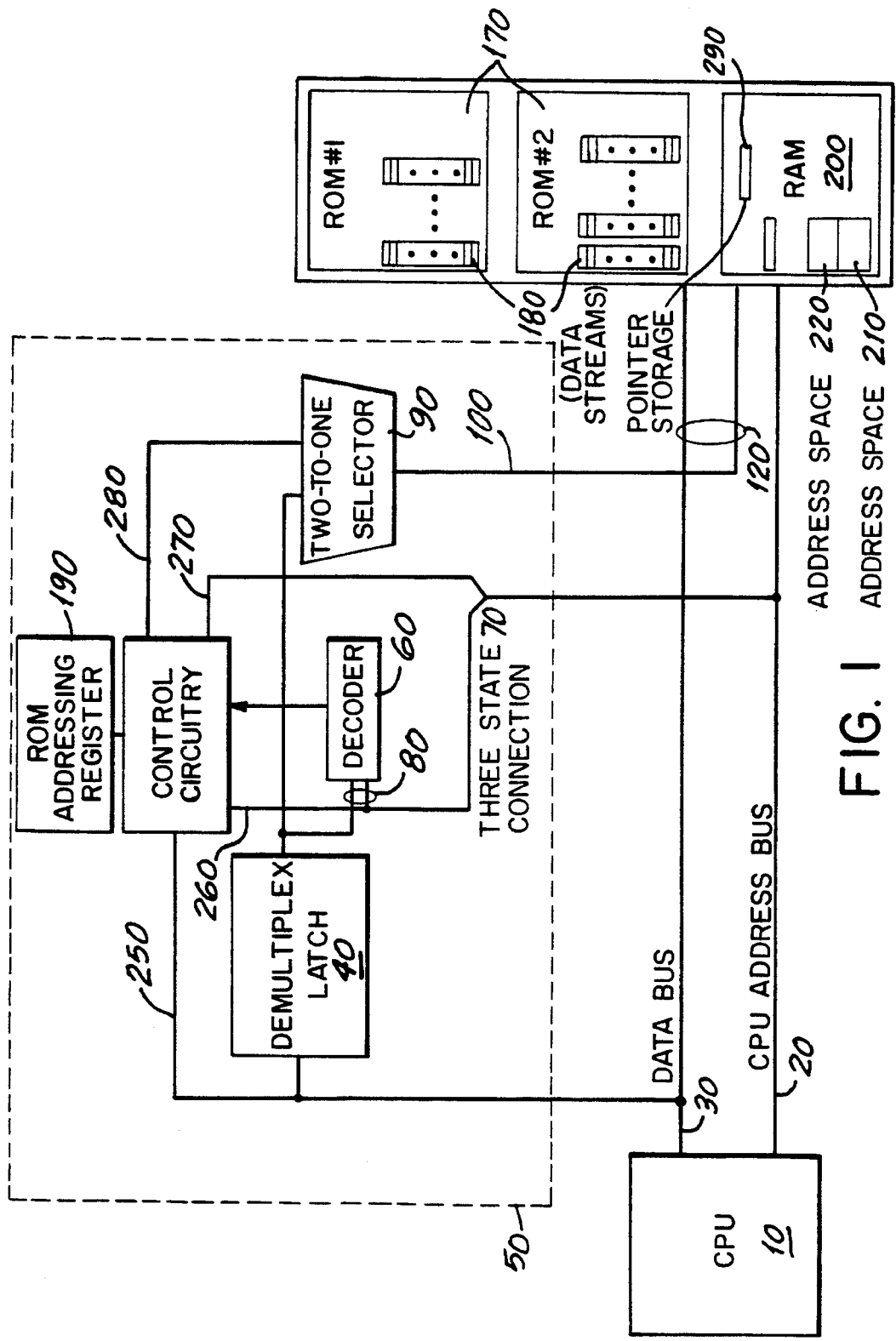
FIG. 1 is a block and flow diagram of an address and data bus arrangement of a computer employing an embodiment of the present invention.

Using FIG. 1 as a reference, a central processing unit (CPU) 10 provides twenty-four bit addresses in a multi-plexing fashion using sixteen bit CPU address bus 20 and eight bit CPU data bus 30. CPU 10 places the lowest sixteen bits of the twenty-four bit address onto CPU address bus 20. The remaining eight bits are placed onto CPU data bus 30, in a multi-plexing fashion. Demultiplex latch 40, provided within custom chip 50, receives and stores the eight bit portion which was placed onto CPU data bus 30. After which time, data bus 30 may return to its data-carrying purposes. Demultiplex latch 40 sends the eight bit portion of the twenty-four bit address to a first input of decoder 60.

The lowest sixteen bits of the twenty-four bit address traverse a three state connection 70 to a second input of decoder 60. Collectively, the inputs of decoder 60 form a twenty-four bit address bus 80 which transports the entire twenty-four bit address sought by CPU 10. Decoder 60 is used by custom chip 50 to monitor the addresses desired by CPU 10.

The output of demultiplex latch 40 is also connected to an input of a two-to-one selector 90. When CPU 10 requests an address which corresponds to an address which is not assigned to lower portion 210, two-to-one selector 90 connects the output of demultiplex latch 40 to eight bit bus 100. Eight bit bus 100 and CPU address bus 20 form twenty-four bit system address bus 120. In this case, the information which originally was transmitted on CPU data bus 30 was rerouted through demultiplex latch 40 and two-to-one selector 90 to be placed onto eight bit bus 100 after being considered by decoder 60. Therefore, the highest eight bits of the address are taken from CPU data bus 30 and placed onto the highest eight bits of system address bus 120 and CPU address bus 20 is directly connected as the lowest sixteen bits of system address bus 120.

Figure 2:
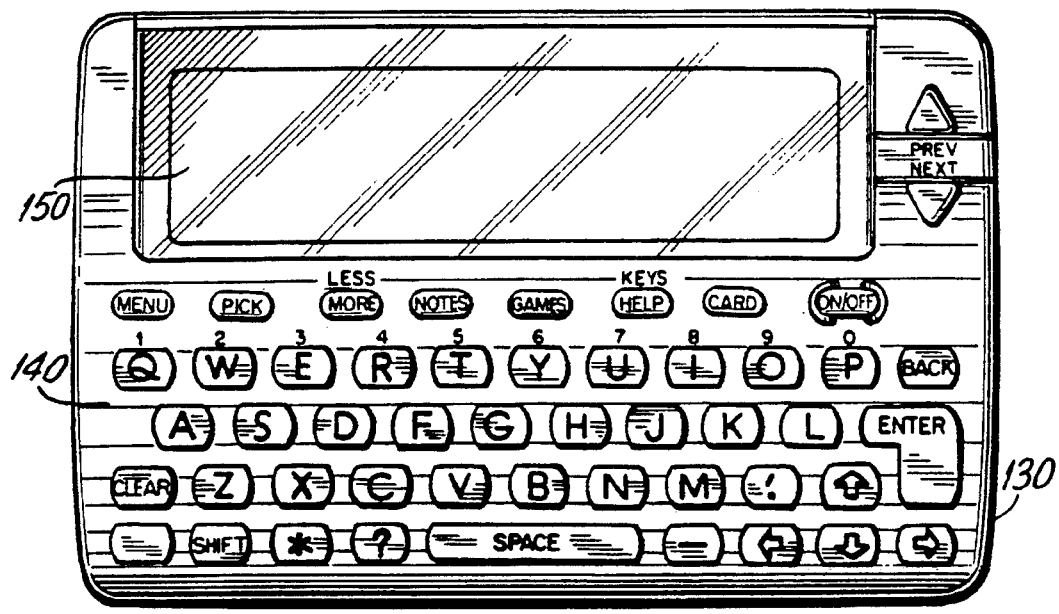
FIG. 2 is a top plan view of a device incorporating the present invention.
Figure 3:
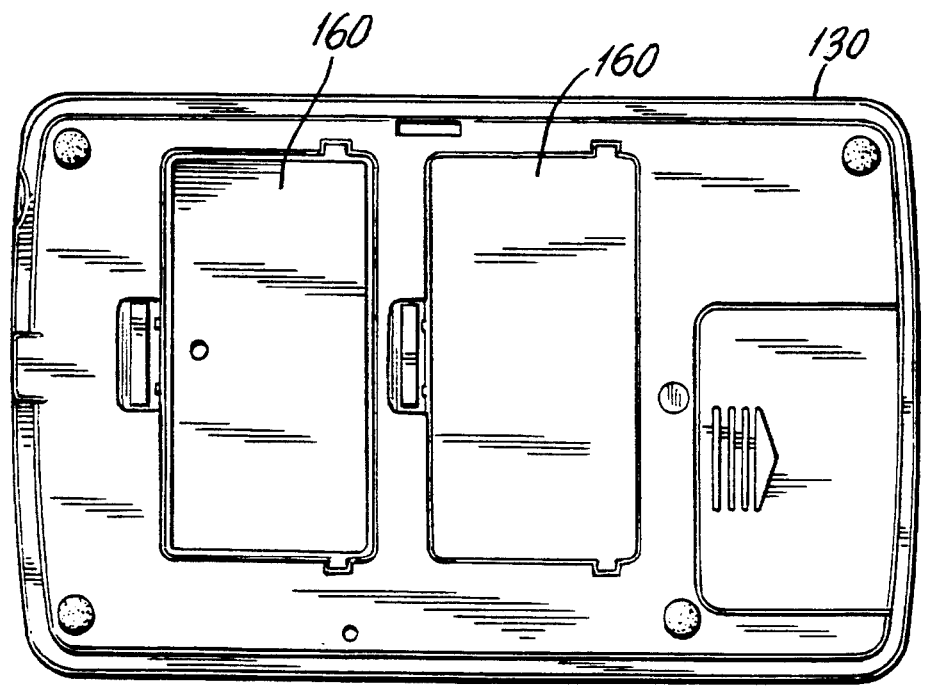
FIG. 3 is a bottom plan view of a device incorporating the present invention.

One of the applications of the present invention is for use in a hand-held, multi-function reading device 130 (FIGS. 2 and 3) having sixteen Mega bytes of address space. Device 130 has a keyboard 140, a display 150 and removable ROM cartridges 160. ROM #1 and ROM #2 of FIG. 1 are provided using removable cartridges 160 and form system ROM 170. Any number of removable cartridges 160 may be provided. Furthermore, a fixed ROM (not shown) may also be provided within device 130.

Referring to FIG. 1, scanning through data streams 180 containing sequentially addressed data is often required, particularly if data is stored using compression. Each data stream 180 occupies a range of sequentially addressed memory spaces within ROM 170. Once an address within the range of addresses is known, sequential scanning may be affected, merely by incrementing the address which is known.

To scan through one of the data streams, the present invention uses a twenty-four bit ROM addressing register 190 to generate sequential twenty-four bit addresses. These addresses are then used to access the information stored in one of the data streams. Since CPU 10 has internal limitations with respect to register size, the reading and incrementing of a binary address which is too large for the internal register must be performed one byte at a time. The use of large external ROM addressing register 190 eliminates the need to perform the incrementing within CPU 10 having limited register capability, thereby increasing the system operation speed. Increasing the operation speed has the dual benefit of providing greater customer satisfaction and reducing battery power consumption.

Referring to FIG. 1, a system having an address space of sixteen Mega bytes is provided, RAM 200 and other functons are provided with addresses within the first Mega byte of address space. The addresses between one Mega byte and sixteen Mega bytes are allocated to ROM 170. Data streams 180 are stored within ROM 170.

The preferred embodiment provides for eight virtual registers. The first sixty-four bytes of address space are reserved. This reserved address space is subdivided into two equal portions; a lower portion 210 and an upper portion 220. The first thirty-two bytes of the address space (lower portion 210) are assigned to specific virtual registers. For example, addresses zero through three are assigned to virtual register #1, addresses four through seven are assigned to virtual register #2, etc. Reading from an address in the lower portion 210 activates the ROM register functions. The address space corresponding to upper portion 220 (bytes 31 through 63) are allocated to RAM storage locations. Four bytes are assigned to each virtual register; three bytes for storing the RAM address of the data stream pointer and a fourth byte for computer architectural convenience.

A relationship between the subdivisions of the upper and lower portions is established wherein, once the address of the subdivision of lower portion 210 is known the address of the corresponding subdivision within upper portion 220 may be obtained. Once the address of the corresponding subdivision of upper portion 220 is obtained, the desired pointer is easily retrieved.

For example, addresses zero (00000000 00000000 00000000) through three (00000000 00000000 00000011)

and thirty-two (00000000 00000000 00100000) through thirty-five (00000000 00000000 00100011) are assigned to virtual register #1. When address zero is detected by decoder 60, control circuitry 230 is activated over line 240. The address sought by CPU 10 is also provided to control circuitry 230 through lines 250 and 260. The address of the pointer which corresponds to data stream #1 is stored at addresses thirty-two through thirty-four. Therefore, since a relationship is established between the individual subdivisions of upper and lower portions 210, 220, once an address within lower portion 210 is detected by decoder 60, the corresponding subdivision within upper portion 220 may be accessed. In the current embodiment, for example, the address thirty-two within upper portion 220 is achieved by adding thirty-two to the corresponding address zero within lower portion 210. This is achieved merely by flipping the bit occupying the sixth binary position from zero to one. Adding thirty-two to the address of lower portion 210 provides access to the address of the desired pointer. Control circuitry 230 then places this address onto the system address bus 120 by sending the lowest sixteen bits over bus 270 through three-state connection 70 to act as the lowest sixteen bits of system address bus 120 and the highest eight bits over bus 280, through selector 90 to bus 100. Control circuitry 230 retrieves the pointer from its RAM storage location 290 and places the pointer into ROM addressing register 190.

When CPU 10 wishes to access one of the data streams 180 located in ROM 170 and assigned to a virtual register, CPU 10 requests an address (zero through thirty-one expressed in binary), corresponding to the location within lower portion 210 which is assigned to the virtual register to be accessed. Decoder 60 detects the presence of this address and activates control circuitry 230. If the pointer which corresponds to data stream 180 sought to be accessed is currently in the ROM addressing register 190, the control circuitry 230 places the contents of the ROM addressing register 190 (the pointer) onto the system address bus 120, which causes the data indicated by the pointer to be placed onto the data bus 30. This operation is termed indirection.

Assuming that ROM addressing register 190 currently contains data stream pointer #1, when CPU 10 attempts to access the address of the processor address space which corresponds to data stream #1 (0–3 expressed in binary), ROM addressing register 190 places its contents onto system address bus 18, since ROM addressing register 190 currently contains data stream pointer #1. The data located at that position in data stream #1 is placed onto data bus 30 and sent to CPU 10.

ROM addressing register 190 then increments pointer #1. Pointer #1 now contains the next sequential address of data stream #1. Corresponding RAM storage location 290 for storing pointer #1 is also updated. The lowest byte of the three-byte pointer is copied into the lowest eight bits of twenty-four bit RAM storage location 290. The upper sixteen bits of twenty-four bit storage location 290 are updated, only if necessary. CPU 10 checks to see if a carry exists before it updates the upper sixteen bits of storage location 290. By updating one byte at a time and checking for a carry, the upper sixteen bits are updated much less frequently, thus saving time and power.

This procedure may be repeated, allowing CPU 10 to scan the data contained in data stream #1. Therefore, sequential ROM addresses are scanned by CPU 10 using the ROM addressing register 190 and control circuitry 230 to supply twenty-four bit addresses to system address bus 120.

If the pointer corresponding to a data stream 180 to be scanned is not currently within ROM addressing register 190, the pointer which is currently in ROM addressing register 190 is overwritten with the new pointer. For example, if data stream #5 is to be scanned, the twenty-four bit address 00000000 00000000 00010000 is sent by CPU 10 to decoder 60. Control circuitry 230 adds thirty-two to this address to obtain the address of pointer #5. Control circuitry 230 places this address (00000000 00000000 00110000) onto system address bus 120 and retrieves the new pointer from its corresponding RAM storage location 290. Pointer #5 is read into ROM addressing register 190 one byte at a time using data bus 30. Once the new pointer is installed in ROM addressing register 190, the steps of indirection, incrementing the pointer, and updating the pointer RAM storage location 290 are performed for each data stream position scanned.

If the eight virtual registers provided have been used, all of the allocated RAM storage locations 290 contain pointers for assigned data streams. If a new data stream which is not currently assigned a position (data stream #n) is to be accessed, one of the twenty-four bit storage locations 290 whose addresses are contained in upper portion 220 of RAM 200 must be overwritten with the new pointer #n. For example, if data stream #n is to be used in place of the data stream #8, pointer #8 is overwritten with pointer #n. Note that the RAM addresses at which the pointers are stored do not change. It is the pointers stored therein which can be changed. During a data stream read routine, the pointer stored within one of the RAM storage locations 290 is continuously updated. If called for by the program, a pointer stored within a given RAM storage location 290 can be overwritten.

By operating ROM addressing register 190 in this manner, the system appears to have a number of twenty-four bit ROM addressing registers equal to the number of pointer storage locations 290 allocated within RAM 200.

Custom chip 50 employed in the present invention may be provided in a number of architectural forms. For example, custom chip 50 may be wholly external to CPU 10. In the wholly-external CPU device, CPU 10 and ROM addressing register 190 are connected to system address bus 120 in a three-state manner for the lowest sixteen bits and through a two-to-one selector for the remaining eight bits.

In an alternate embodiment, the CPU and the ROM addressing register may both be positioned within a custom chip. In this embodiment, an address selecting device is included within the custom chip to select the twenty-four bit address to be placed on the system address bus from the CPU and the ROM addressing register outputs.

What is claimed is:

1. In an electronic book having a system address bus, a database in ROM, a CPU with a data bus and a CPU address bus, the improvement in addressing data streams in the database comprising:

a ROM addressing register coupled to the system address bus, a RAM coupled to the system address bus, a first set and a second set of system addresses, said RAM having a set of RAM spaces which are addressed by said second set of addresses, each of said set of RAM spaces having a ROM addressing pointer stored therein, each member of said first set of addresses having a correspondence to a predetermined separate one of said second set of addresses, and a selector circuit responsive to the addressing of any one of said first set of addresses by the CPU to cause the pointer stored at the RAM space designated by the corresponding one of said second set of addresses to be loaded into said ROM addressing register, if that pointer is not already in said register, said ROM addressing register addressing the data stream identified by the pointer loaded into said register when the CPU addresses a predetermined address, the reading of said data stream placing data from said database onto the data bus of said CPU.

2. The addressing improvement of claim 1 wherein:

said predetermined address addressed by the CPU during said data stream address is the corresponding one of said first set of addresses.

3. The addressing improvement of claim 1 further comprising:

a control circuit for incrementing said pointer in said RAM as well as in said ROM addressing register as said data stream is being read.

4. The addressing improvement of claim 2 further comprising:

a control circuit for incrementing said pointer in said RAM as well as in said ROM addressing register as said data stream is being read.

5. The addressing improvement of claim 1 wherein:

said first set of addresses is below and adjacent to said second set of addresses.

6. The addressing improvement of claim 2 wherein:

said first set of addresses is below and adjacent to said second set of addresses.

7. The addressing improvement of claim 3 wherein:

said first set of addresses is below and adjacent to said second set of addresses.

8. The addressing improvement of claim 4 wherein:

said first set of addresses is below and adjacent to said second set of addresses.

9. The method of reading data streams from a database in memory in an electronic book, the electronic book having a CPU and a system address bus for reading the database under control of an applications program comprising the steps of:

storing database address pointers in RAM at a second set of system addresses, transferring one of said database address pointers to a register in response to the CPU addressing one of a first set of system addresses, said step of transferring occurring only when the selected pointer in said RAM differs from the pointer in said register, each member of said first set of system addresses being correlated with a predetermined separate member of said second set of addresses, reading data from memory using said address pointer in said register, incrementing said address pointer in said register to read through a data stream, updating the corresponding pointer address in RAM by the time a sequential data stream read is completed to provide a pointer in RAM for re-accessing the data stream.

10. The method of claim 9 wherein:

said step of updating is taken at each step of incrementing.

11. The method of claim 9 further comprising the steps of:

said CPU addressing one of said second set of addresses when the pointer is in said RAM is to be changed, and said CPU addressing the correlated one of said first set of addresses during a data stream read using a pointer in said register that has been transferred from the correlated one of said second set of addresses in RAM.

* * * * *